(12) United States Patent
Finucane et al.

(10) Patent No.: US 10,769,961 B2
(45) Date of Patent: Sep. 8, 2020

(54) APPARATUS AND METHOD FOR VISUAL AND AUDIBLE DEMONSTRATION OF MUSICAL CONCEPTS

(71) Applicants: Brendan Finucane, Chicago, IL (US); Farsheed Hamidi-Toosi, Chicago, IL (US)

(72) Inventors: Brendan Finucane, Chicago, IL (US); Farsheed Hamidi-Toosi, Chicago, IL (US)

(73) Assignee: Soapbox Music, LLC, Chicago, IL (US)

(*) Notice: Subject to any disclaimer, the term of this patent is extended or adjusted under 35 U.S.C. 154(b) by 0 days.

(21) Appl. No.: 16/257,069

(22) Filed: Jan. 24, 2019

(65) Prior Publication Data

US 2020/0242960 A1 Jul. 30, 2020

(51) Int. Cl.
G09B 15/00 (2006.01)

(52) U.S. Cl.
CPC .................... *G09B 15/002* (2013.01)

(58) Field of Classification Search
CPC ................ G09B 15/002; G09B 15/02
See application file for complete search history.

(56) References Cited

U.S. PATENT DOCUMENTS

| | | | | |
|---|---|---|---|---|
| 229,545 A | * | 7/1880 | McClain | G09B 15/007 84/474 |
| 3,572,205 A | * | 3/1971 | Scholfield | G09B 15/007 84/474 |
| 4,305,323 A | * | 12/1981 | Graham | G09B 15/007 84/471 SR |
| 4,716,806 A | * | 1/1988 | Forrest | G09B 15/02 84/474 |
| 4,881,443 A | * | 11/1989 | Bertram | G09B 15/001 84/473 |
| 5,288,234 A | * | 2/1994 | Hamzi | G09B 15/004 434/404 |
| 5,320,020 A | * | 6/1994 | Corley | G10G 1/02 84/474 |
| 5,709,552 A | * | 1/1998 | LeGrange | G09B 15/007 434/404 |
| 6,031,172 A | * | 2/2000 | Papadopoulos | G09B 15/004 84/470 R |
| 7,141,731 B2 | * | 11/2006 | Vallery | G09B 15/009 84/474 |
| 8,455,747 B2 | * | 6/2013 | Lozano, Jr. | G09B 15/02 84/470 R |
| D710,367 S | * | 8/2014 | Quattrocchi | D14/485 |
| 9,076,346 B2 | * | 7/2015 | Quattrocchi | G09B 15/023 |
| 2015/0007707 A1 | * | 1/2015 | Quattrocchi | G09B 15/023 84/477 R |

\* cited by examiner

*Primary Examiner* — Robert W Horn

(57) ABSTRACT

The inventors disclose a new apparatus and method for visual and audible demonstration of musical concepts such as intervals, the tonic, transposition, scales, modes, and chords. The apparatus is based on a primary layer of indicia for each of the 12 chromatic notes of the musical octave, each indicium paired with a touch sensor. A novel means for superimposing additional layers of musical information employs a tonic indicator and encoder, and modular physical indicator pieces or multi-colored LED lights.

14 Claims, 9 Drawing Sheets

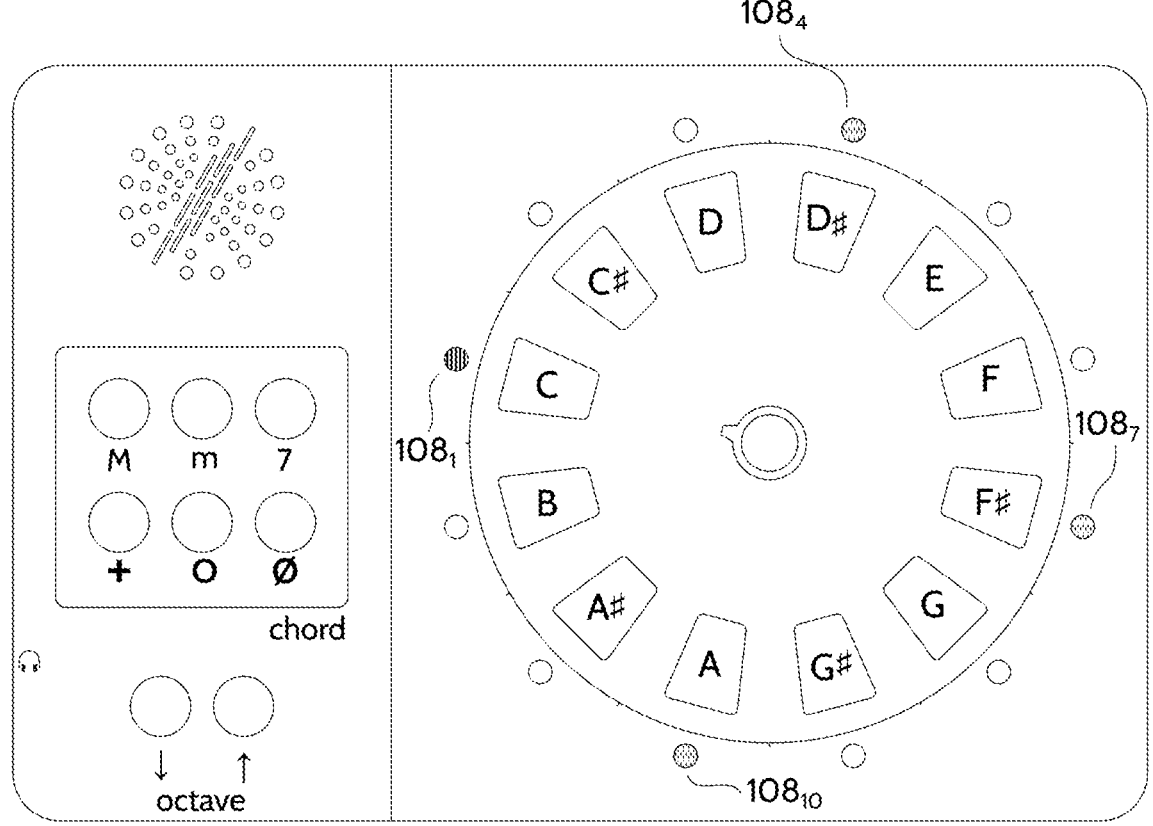

APPARATUS AND METHOD FOR VISUAL AND AUDIBLE DEMONSTRATION OF MUSICAL CONCEPTS

CROSS-REFERENCE TO RELATED APPLICATIONS

No right of priority to provisional patent application 62/535,152 CHROMATIC MUSICAL INSTRUMENT AND MUSIC TEACHING/LEARNING APPARATUS CHROMAWHEEL, filed on Jul. 20, 2017, can be claimed; however, the current patent application relates to the invention described therein.

STATEMENT REGARDING PRIOR DISCLOSURES BY THE INVENTOR OR A JOINT INVENTOR

The inventors publicly disclosed the apparatus and method on Jan. 25, 2018 via a video hosted at www.youtube.com/watch?v=9PsPJ5Zw6Lk, the following day at a booth at the ILMEA/IMEC music educator's conference in Illinois, and via their website www.chromawheelmusic.com.

BACKGROUND OF THE INVENTION

Field of the Invention

The present invention relates to the teaching of music concepts, and specifically to means of indicating and demonstrating music concepts, both electrically and non-electrically operated, with and without sound emitters.

Description of the Related Art

The idea of demonstrating music concepts visually using a circular apparatus that superimposes multiple layers of musical Information dates back at least to 1853 with patent US10217A for a "keyvolving wheel". This 1853 invention, and all subsequent prior art in the field, makes use of a primary layer consisting of some sort of base, usually a board or plate, on which indicia for the 12 notes of the musical octave are radially arranged in chromatic order.

Beyond this, the central problem that the above and all subsequent innovations have attempted to solve is the necessity of clearly demonstrating—while also differentiating between—a second and third additional layer of superimposed musical information. It should be clarified that this concept of "layers of musical information" employed here does not refer to discrete physical layers, but rather to discrete types of musical information.

Over the primary base layer of chromatic indicia, a second layer of musical information, or "selection layer", must be demonstrated. The selection layer typically demonstrates a subset of the 12 chromatic notes represented by the indicia on the base layer. For example, the foundational 7-note major scale is frequently demonstrable. The third layer of necessary musical information is a further subselection of the second layer, usually chord tones or other functional information such as start point, tonic, or root note. All prior art attempts to address this problem suffer from one or more of the following crucial limitations: A) The selection (scale) layer is restricted, B) The subselection (chord and function) layer is restricted, C) The distinction between selection and subselection layers is unclear, D) There is mechanical difficulty in making selections and/or subselections, E) Considerable music theory is prerequisite, F) Interaction is "answer-key" like, G) There is a lack of audible demonstration capability.

The 1853 keyvolving wheel patent US10217A mentioned above uses a 7-pointed rotating wheel-shape to accomplish the task of the selection layer. The 7-pointed wheel can be rotated to clearly demonstrate the notes of any major scale. For example, it can be set to demonstrate the notes of C major. C, D, E, F. G, A, B. The crucial limitation here is that based on the shape of the wheel, the only type of scale that can be demonstrated is the diatonic 7 note scale: the major scale and its modes.

To accomplish the task of a third, subselection layer, the 1853 keyvolving wheel uses a system of triad chord pointers. For example, above the 7 note C major scale described previously, the chord pointers can be arranged to select C, E, and G, the three notes constituting a C major triad chord. Some limitations in demonstrability within the third layer in this apparatus flow from the limitations in the second: the only chords that can be coherently demonstrated are triads derived from the familiar seven-note diatonic scale: Do, Re, Mi, Fa, So, La, Ti. While certainly useful, this invention obviously leaves a universe of scale and chord possibilities unexplorable. What's more, the invention envisions no method of audible demonstration.

2016 U.S. Pat. No. 9,378,653B2 is a more recent innovation in the field. It overcomes the 1853 patent's limitations in the selection layer by making use of a plurality of interchangeable scale wheels to demonstrate a wide variety of different scales. One crucial limitation here is that the user is limited to the existent prefabricated scale wheels. Another limitation is that the process of interchanging wheels is not one that facilitates learning via open-ended interaction, visual and audible pattern-matching, experimentation and play. Rather, the prefabricated scale wheels function like "answer keys" in the sense that rather than thinking critically about how to construct for example a major scale via pattern-matching based on intervallic content, a user simply selects the correct wheel based on its ordinary language label: "Major Scale Wheel".

The 2016 apparatus also develops on the 1853 patent with respect to the function of demonstrating the subselection layer. There the inventor proposes a system of pointers with the addition of variously-shaped interval spacer pieces to demonstrate simple chords. The necessity for interval spacer pieces means that 4-note chords such as seventh chords would prove difficult to construct mechanically as well as conceptually. Not only would the process be time-consuming, but advanced music theory would be required to understand the way major and minor third intervals are spaced between the notes of the several seventh chords. Further, this invention does not envision audible demonstration.

Finally, much of the prior art fails to differentiate clearly, if at all, between the selection and subselection layers. For example, the apparatus described in 1976 patent U.S. Pat. No. 3,969,973A can easily demonstrate either a scale or a chord through the opening of the correct combination of apertures. However, there is no way to demonstrate the relationship between the scale and the chord—the fact that the C major triad chord is a subselection of the notes of the C major scale cannot be demonstrated visually or audibly.

In summary, the limitations found in all the prior art are in some combination of the following:
1) Restricted demonstration possibilities in selection (scale) layer of musical information.
2) Restricted demonstration possibilities in subselection (chord and function) layer of musical information.

3) Inadequate distinction between the two layers.
4) Mechanical difficulty in making selections and/or subselections
5) Considerable music theory prerequisites
6) Answer-key like interaction
7) Lack of audible demonstration capability

BRIEF SUMMARY OF THE INVENTION

As music teachers working with beginning musicians and younger students without knowledge of music theory, the above-described limitations in the prior art were unacceptable. We had as objects of our invention the satisfaction of the following criteria:
1) Unrestricted selection and demonstration of combinations and permutations of notes In the selection layer. The standard scales, intervals and chords of western music, as well as the scales of other cultures should be demonstrable. Beyond these traditional patterns, the user should be able to freely select and transpose imaginative patterns limited only by the 12 chromatic indicia in the base layer. There are (12!), or 479,001,600 such possibilities!
2) Unrestricted possibilities within the subselection (chord, function) layer of musical Information.
3) Clear and simple visual distinction between the second and third layers, and also between the two roles of the third layer: demonstration of chord tones, and demonstration of functions like tonic, and mode start point.
4) Simple and quick demonstration capability via selection and subselection of notes.
5) Suitable for young students and beginners without music theory background.
6) Interaction that encourages deeper and more meaningful learning via construction, visual and audible pattern-matching, experimentation, and play.
7) Audible demonstration capability.

The objects above are obtained with an apparatus according to claim 1. The dependent claims and the following description and drawings present various specific embodiments that solve additional problems and/or provide additional benefits.

BRIEF DESCRIPTION OF THE SEVERAL VIEWS OF THE DRAWINGS

In the following section, "Detailed Description", specific embodiments of the invention will be described in greater detail in connection with Illustrative but non-restrictive examples. A reference is made to the following drawings:
FIG. 20 shows an embodiment of the invention without a center piece and physical indicator pieces, where LED lights are demonstrating the musical information.

DETAILED DESCRIPTION OF SOME SPECIFIC EMBODIMENTS OF THE INVENTION

Figure 1:
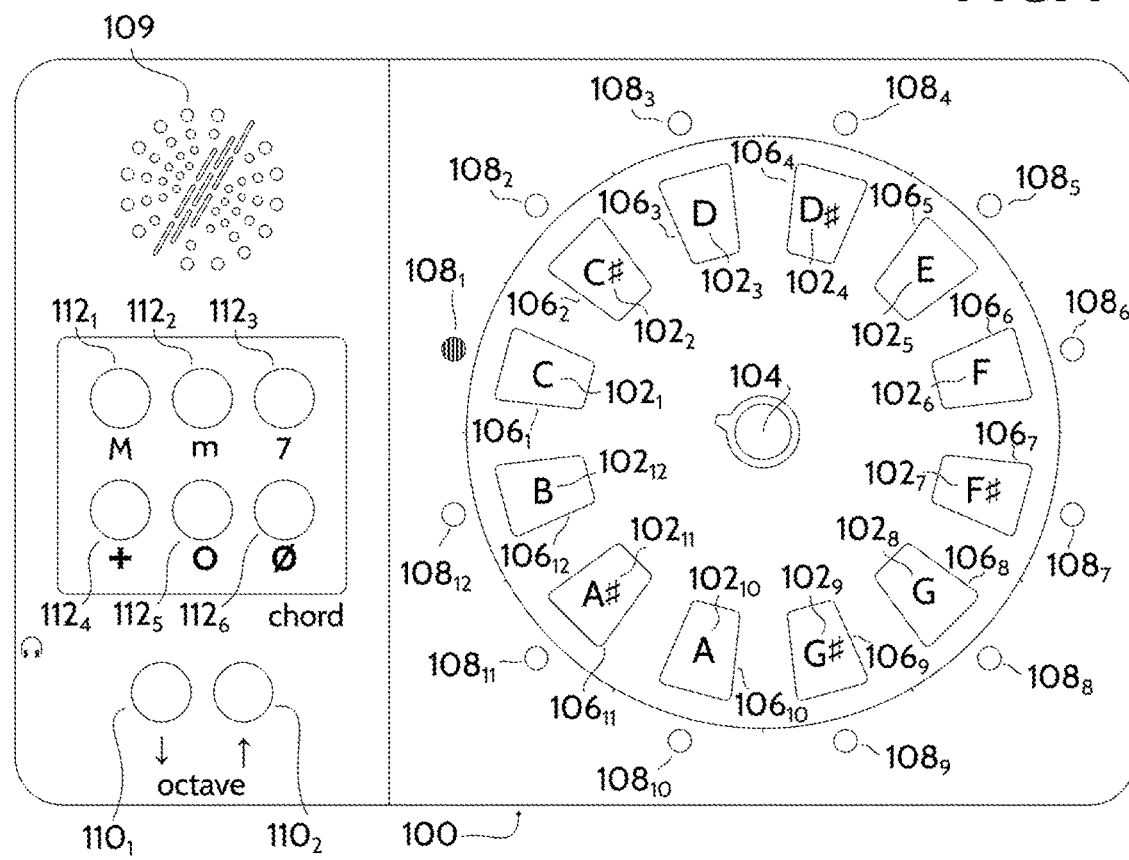
FIG. 1 shows a top view of the preferred embodiment.

According to claim 1, there is produced the following apparatus and method for visual and audible demonstration of musical concepts comprising:

A base plate made of ⅛" wood, on which indicia representing the 12 notes of the musical octave are arranged radially in chromatic order. This base plate demonstrates the primary layer of musical information.

Each of the chromatic indicia is coupled to a capacitive touch sensor, which is further connected to a microcontroller equipped with inputs capable of detecting changes in capacitance. The microcontroler triggers a subsequent "NOTE ON" event if the input signal goes above an average threshold, and if it goes below the threshold triggers a "NOTE OFF" event. As part of a "NOTE ON" event, several things occur simultaneously: the audio for a given note is digitally synthesized and output to a speaker and headphones, control signals associated with that note are sent to MIDI and CV outputs, and an "ON" signal is sent to an indicator light proximal to the given note indicia/sensor pair.

At the center, above and perpendicular to the plane of the base plate, a rotating tonic encoder/indicator knob is mounted, and connected to the microcontroller. For the purpose of audible demonstration, this knob sets a start point. The lowest note of the chromatic octave synthesized for audio output is set to whichever note is indicated as the tonic, and the chromatic half steps proceed in ascending order, clockwise.

Above and parallel to the base plate, a rotating "center piece", along whose circumference 12 concave puzzle connector shapes are evenly distributed radially.

One of the 12 concave puzzle connector shapes being larger than the remaining 11. The center piece is attached in fixed orientation to the tonic encoder/indicator knob such that the knob's indicator is permanently aligned with the single, larger concave puzzle connector shape, and both the knob and the center piece rotate as a unit.

To accomplish the function of the selection layer of musical information, a set of 11 wooden pie-shaped "window pieces", natural wood on one side and purple colored on the other, each featuring at the narrow end a convex puzzle connector, and at the wide end a window cutout, such that when a single window piece is connected to any of the 11 concave puzzle connectors in the center piece, one of the 12 chromatic indicia is selected under its window.

To accomplish the function of subselection of a "tonic", or start point, a single, visually distinct twelfth pie-shaped window piece colored red. The tonic piece features a larger convex puzzle connector shape at its narrow end, and it can therefore connect only to the larger concave puzzle connector shape in the center piece. This larger concave connector in the center piece is aligned with the "tonic/start point indicator" encoder knob, and so communicates the position of the start point of the octave to the microcontroller for visual and audible demonstration purposes.

The above-described apparatus can be used to simultaneously demonstrate a C major scale in the selection layer (C, D, E, F, G, A, B), a tonic, or start point to that scale (C) In the subselection layer, and the root, third and fifth of a minor triad chord built on the second scale degree (D, F, A), also in the subselection layer.

The red tonic window piece is connected to the center piece, which is then rotated until the note C is selected under its window. Six window pieces are connected to the center piece, natural wood side up, to indicate the unique position of the remaining notes in the C major scale (D, E, F, G, A, B). Within this selection of notes, the window pieces above the indicia for D, F, and A are flipped over to reveal their purple colored sides, visually demonstrating a minor triad (ii) in the subselection layer.

FIG. 1 is a top view of the base plate of a preferred embodiment of the apparatus according to claim 1. Reference number 100 denotes a base plate made of of ⅛" wood, and reference numbers $102_1$ . . . $102_{12}$ denote indicia representing the 12 notes of the musical octave arranged radially in chromatic order. As described in claim 5, tonic encoder/indicator knob 104 is shown at the center of the radial arrangement of indicia. The orientation of the knob visually indicates that the tonic is set to the note C. As described in claim 6, 12 rounded trapezoids each paired with a single note indicium, show the location of 12 capacitive touch sensors $106_1$ . . . $106_{12}$ underneath the base plate. As described in claim 7, 12 LED lights $108_1$ . . . $108_{12}$ are shown and, a speaker 109 is also shown. A single LED light is illuminated red $108_1$, indicating the position of the tonic, as described in claim 9. Octave up $110_1$ and octave down $110_2$ buttons as per claim 10, and chord buttons $112_1$ . . . $112_6$ as per claim 11 are also shown.

Figure 2:
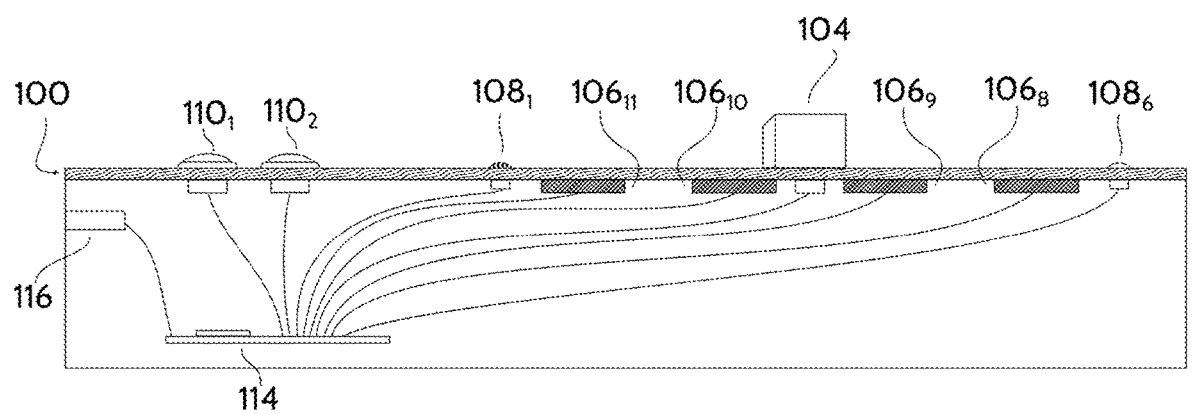
FIG. 2 shows an internal side view of the preferred embodiment.

FIG. 2 is an Internal side view of a preferred embodiment of the apparatus according to claim 1. Connections from the microcontroller 114 to, from left to right, a headphone out jack 116 (claim 6), indications for placement of octave 110 (claim 10), a red illuminated LED $108_1$, (claim 9), four capacitive touch sensors $106_8$ . . . $106_{11}$ (claim 6), the tonic encoder/indicator knob 104 (claim 5), and an unilluminated LED $108_6$ are all shown.

Figure 3:
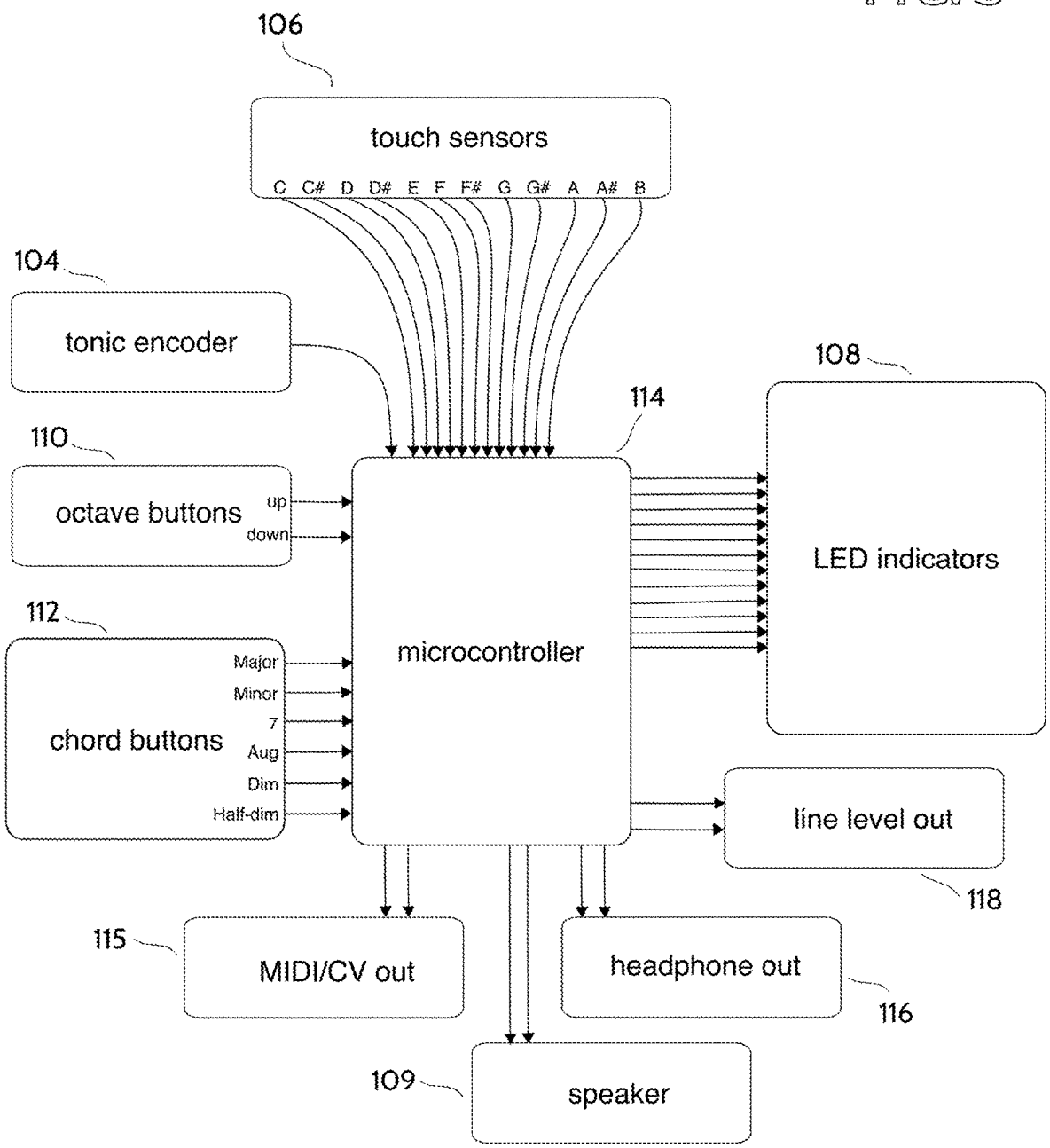
FIG. 3 shows a functional diagram of the preferred embodiment.

FIG. 3 is a functional diagram of a preferred embodiment of the apparatus according to claim 1. It features "signal in" paths at left and top from touch sensors 106, octave buttons 110, chord buttons 112, and tonic encoder 104 to the microcontroler 114. At bottom and right, "signal out" paths from microcontroller 114 to MIDI/CV out 115, LED indicator lights 108, line level out 118, speaker 109 and headphone out 116 are all shown.

Figure 4:
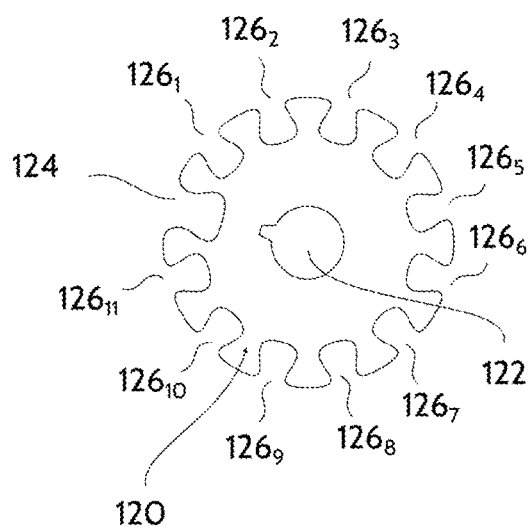
FIG. 4 shows a top view of the center piece assembly.

FIG. 4 is a top view of center piece 120 with a center hole cutout 122 designed such that it fits snugly over the tonic encoder/indicator knob in FIG. 1. It also shows the larger concave connector slot 124 of the center piece, as well as the smaller concave connector slots $126_1$ . . . $126_{11}$.

Figure 5:
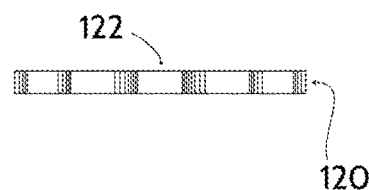
FIG. 5 shows a side view of the center piece assembly.

FIG. 5 is a side view of center piece 120, showing position of center hole cutout 122.

Figure 6:
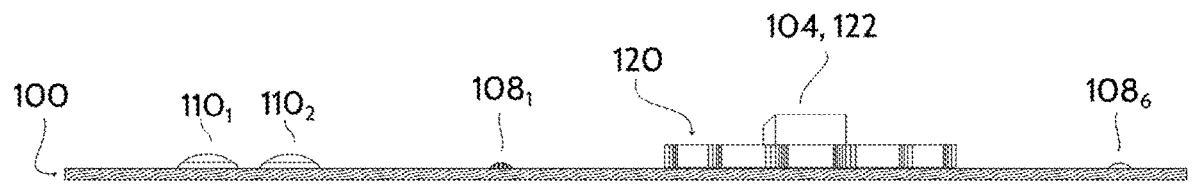
FIG. 6 shows a side view of the top surface of the preferred embodiment.

FIG. 6 is a side view of the top surface of base plate 100 of a preferred embodiment of the apparatus according to claim 1, with center piece 120 attached. From left to right it shows octave buttons $110_1$ and $110_2$ (claim 10), a red illuminated LED $108_1$ (claim 9), center piece puzzle connector 120, tonic encoder/indicator knob 104 aligned with center hole cutout 122, and unilluminated LED $108_8$.

Figure 7:
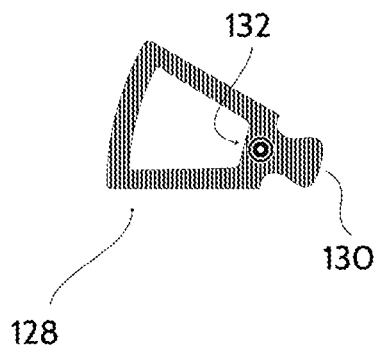
FIG. 7 shows a top view of a red colored tonic "window piece".

FIG. 7 is a top view of a red colored tonic "window piece" 128, that has a larger connector shape 130 that fits the larger connector slot of the center piece shown in FIG. 4. In addition to the color red, it is marked by a bullseye symbol 132.

Figure 8:
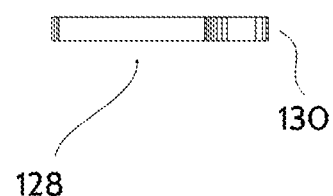
FIG. 8 shows a side view of a red colored tonic "window piece".

FIG. 8 is a side view of the red colored tonic "window piece" 128, and has a height that matches that of center piece shown in FIG. 4. The larger connector shape 130 is shown as well.

Figure 9:
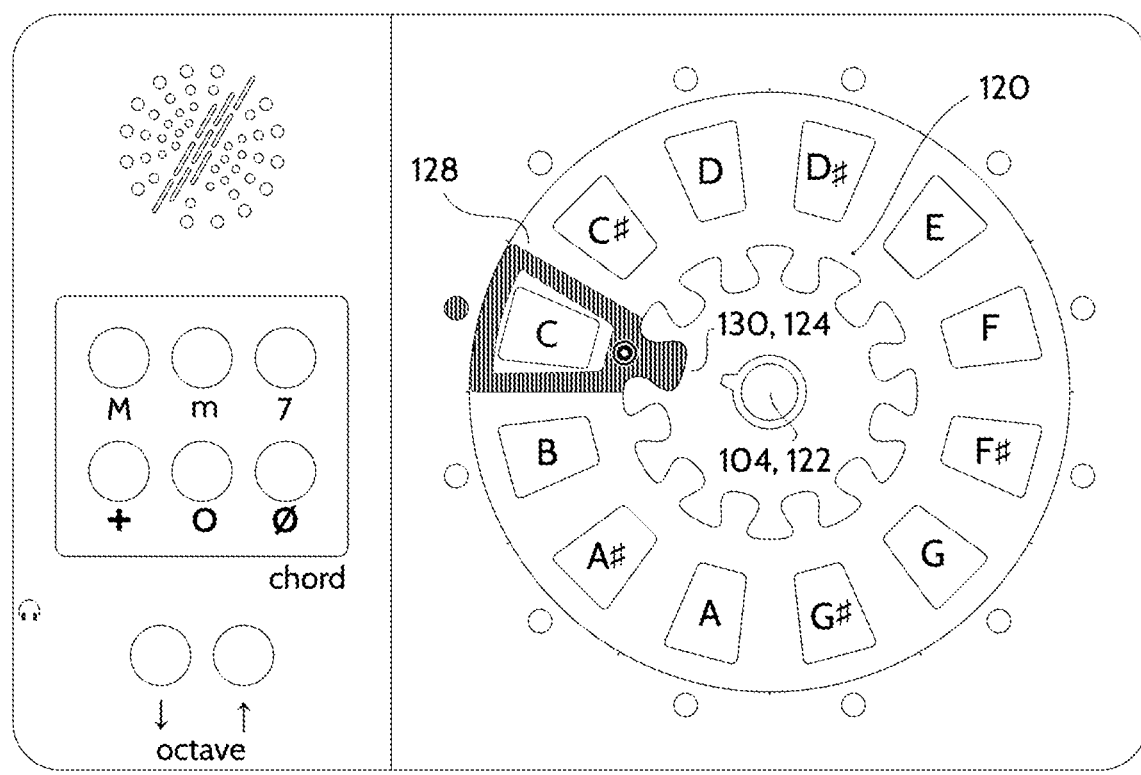
FIG. 9 shows a top view of the preferred embodiment with the red colored tonic piece in place.

FIG. 9 is an overhead view of a preferred embodiment of the apparatus according to claim 1. It shows red colored tonic "window piece" 128 with its larger connector shape 130 connected to the larger puzzle connector slot 124 of the center piece 120 (claim 3), with larger connector shape 130 permanently aligned with the tonic encoder/indicator knob 104 (claim 6) due to the center hole cutout 122 fitting snugly over the tonic encoder/indicator knob 104.

Figure 10:
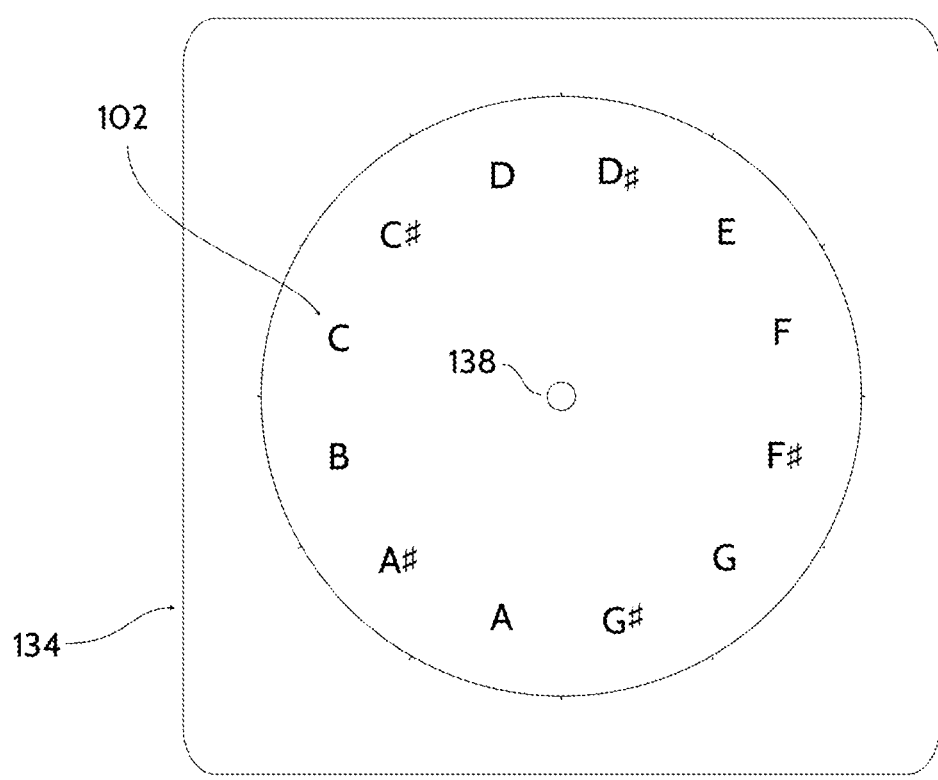
FIG. 10 shows a top view of a non-electronic embodiment of the invention.

FIG. 10 is a top view of a non-electronic embodiment of the apparatus according to claim 1. Reference number 134 denotes a base plate made of of ⅛" wood, and reference number 102 denotes indicia representing the 12 notes of the musical octave arranged radially in chromatic order. At the center is a raised mounting spindle 138.

Figure 11:
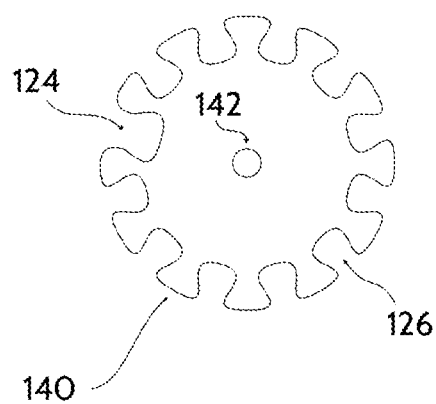
FIG. 11 shows a top view of the non-electronic embodiment version of the center piece.

FIG. 11 is a top view of the center piece 140, containing a larger connector slot connector 124 as well as smaller connector slots $126_1$ . . . $126_{11}$. It has a center hole cutout 142 that is the same size as mounting spindle of base plate shown in FIG. 10. The idea is that when mounted the center hole cutout 142 of center piece 140 can rotate around mounting spindle shown in FIG. 10.

Figure 12:
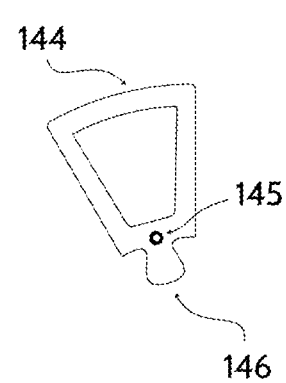
FIG. 12 shows a top view of a note "window piece".

FIG. 12 is a top view of a note "window piece" 144, that has a smaller connector shape 146 designed to fit with the smaller connector slots shown in FIG. 11 and FIG. 4. The note window piece has a height that matches that of the similar red tonic "window piece" shown in FIG. 8. It is marked by a circle symbol 145.

Figure 13:
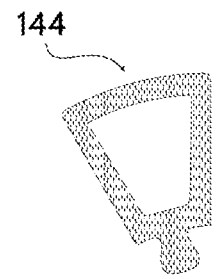
FIG. 13 shows a bottom view of a note "window piece", which is colored purple.

FIG. 13 is a bottom view of the note "window piece" 144 that is painted with a purple color used to indicate subselection musical information such as chord tones and mode start points.

Figure 14:
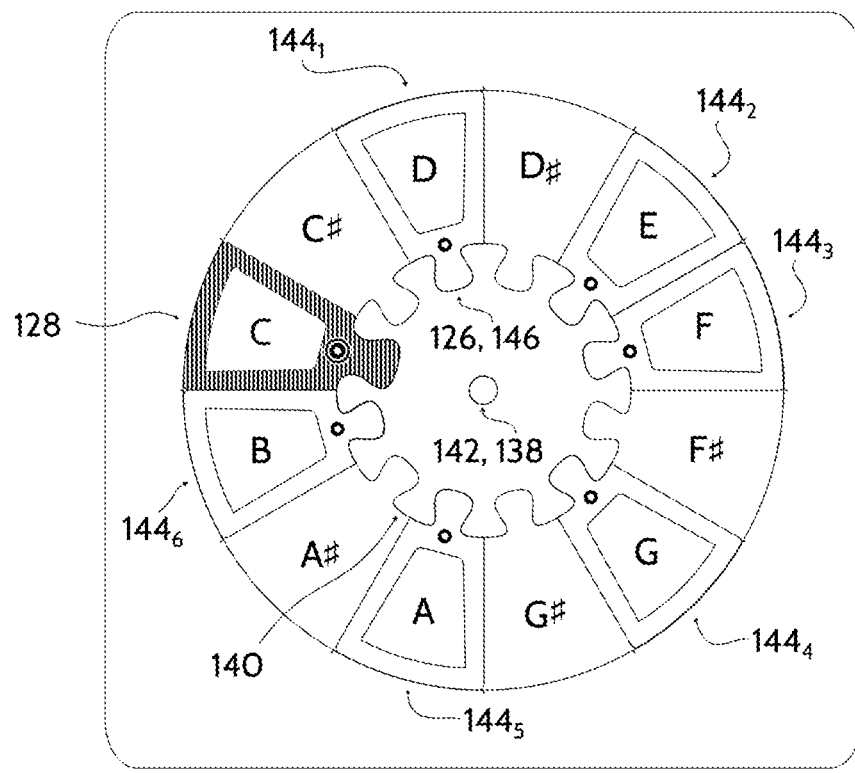
FIG. 14 shows a top view of an assembled non-electronic embodiment, demonstrating the C major scale.

FIG. 14 is a top view of the assembled non-electronic embodiment of FIG. 10, demonstrating the C major scale. In this view you can see the center hole cutout 142 aligned with mounting spindle 138 such that center piece 140 can rotate. You can also see how the smaller connector shape 146 fits the smaller connector slot 126 of the center piece 140. The start of the scale is denoted by the red tonic "window piece" 128 over the note C, and moving clockwise the note "window piece" $144_1$ . . . $144_6$ select and demonstrate the remaining notes of the C major scale: D, E, F, G and A.

Figure 15:
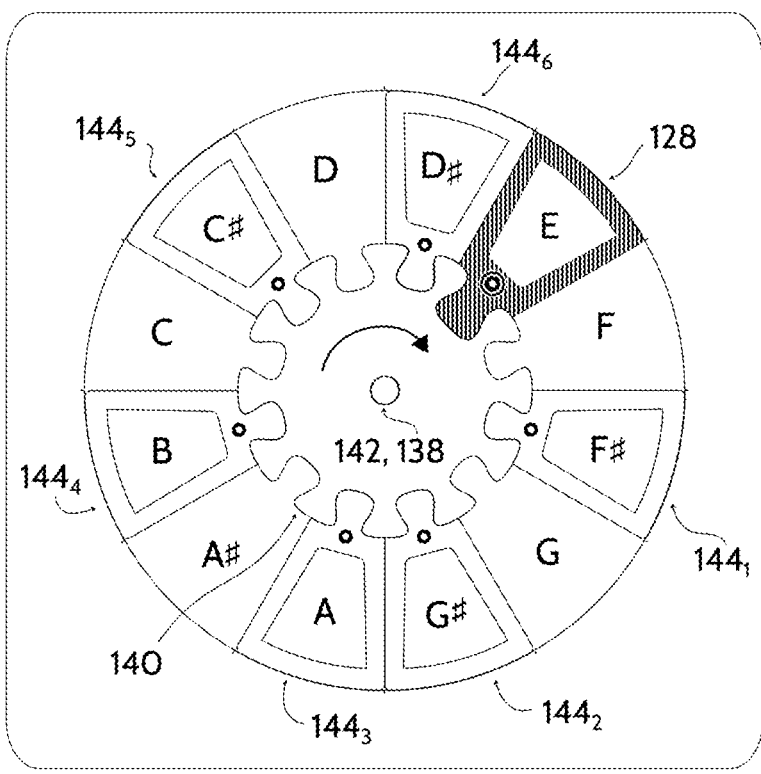
FIG. 15 shows a top view of an assembled non-electronic embodiment, demonstrating the E major scale.

FIG. 15 is a top view of the assembled non-electronic embodiment of FIG. 10, demonstrating the E Major scale. This transposed arrangement has been achieved by simply rotating the center piece such that the red tonic "window piece" 128 now aligns with E. This is possible because the center hole cutout 142 is aligned with mounting spindle 138 such that center piece 140 can rotate. The start of the scale denoted by the red tonic "window piece" 128 is now over the note E, and moving clockwise the note "window piece" $144_1 \ldots 144_6$ now select and demonstrate the remaining notes of the E major scale: F #, G #, A, B, C #, and D #.

Figure 16:
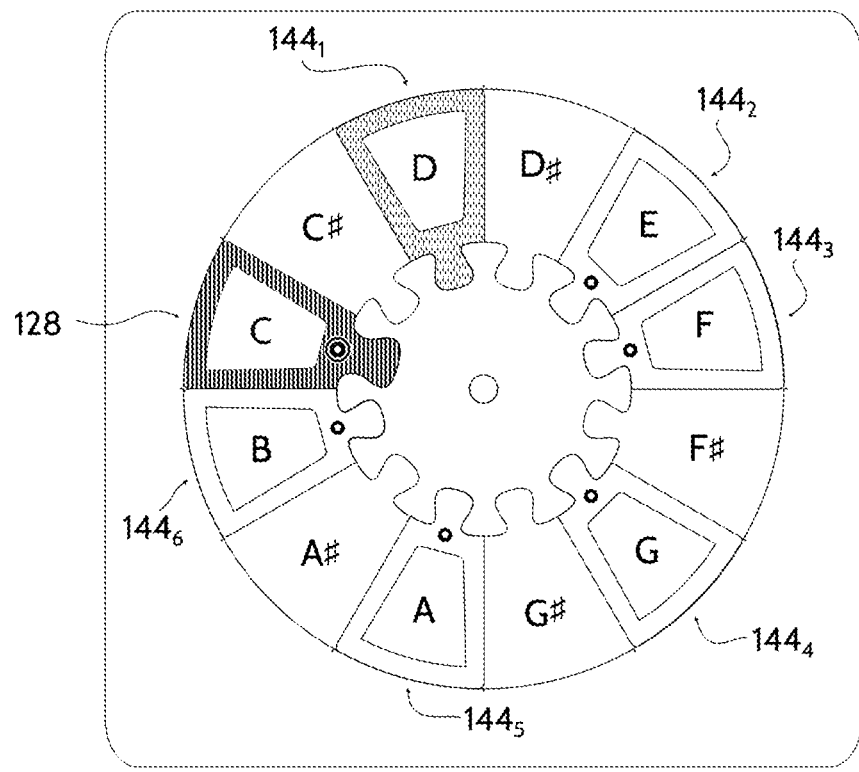
FIG. 16 shows a top view of an assembled non-electronic embodiment, demonstrating the dorian mode of the C Major scale.

FIG. 16 is a top view of the assembled non-electronic embodiment of FIG. 10, demonstrating the dorian mode of the C Major scale. The start of the scale is denoted by the red tonic "window piece" 128 over the note C, and moving clockwise the note "window piece" $144_1 \ldots 144_6$ select and demonstrate the remaining notes of the C major scale: D, E, F, G, A, and B. In addition, window piece $144_1$ has been flipped, revealing its purple colored side, which demonstrates the note D as a secondary mode starting point in the subselection layer of musical information. The mode of the C Major scale where the scale begins on the note D is the dorian mode. Here, selection (scale) and subselection (tonic, and mode start point) layers of musical information are clearly demonstrated and differentiated.

Figure 17:
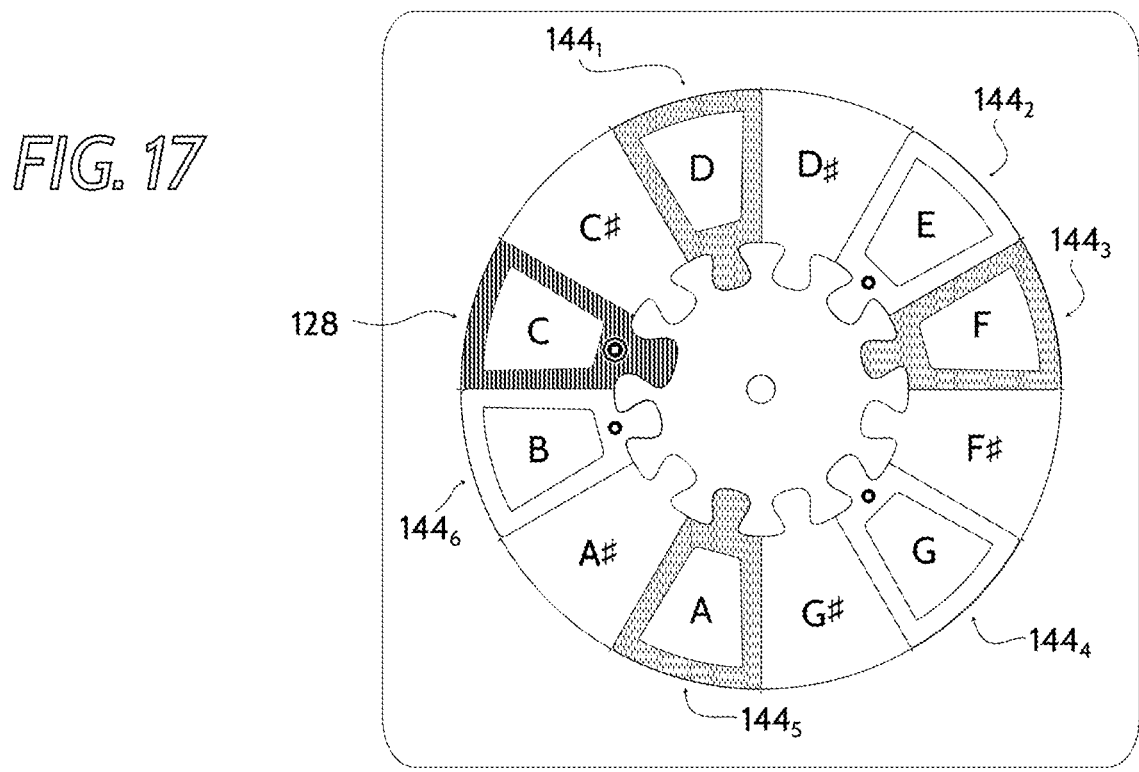
FIG. 17 shows a top view of an assembled non-electronic embodiment, demonstrating the minor ii triad chord within the notes of the C Major scale.

FIG. 17 is a top view of the assembled non-electronic embodiment of FIG. 10, demonstrating the minor ii triad chord within the notes of the C Major scale. The start of the scale is denoted by the red tonic "window piece" 128 over the note C, and moving clockwise the note "window piece" $144_1 \ldots 144_6$ select and demonstrate the remaining notes of the C major scale: D, E, F, G. A and B. In addition, window pieces $144_1$, $144_3$, and $144_5$ have been flipped to reveal their purple colored sides, which demonstrate the notes D, F and A as the chord tones of the minor triad chord ii. Here, selection (scale) and subselection (tonic, chord) layers of musical information are clearly demonstrated and differentiated.

Figure 18:
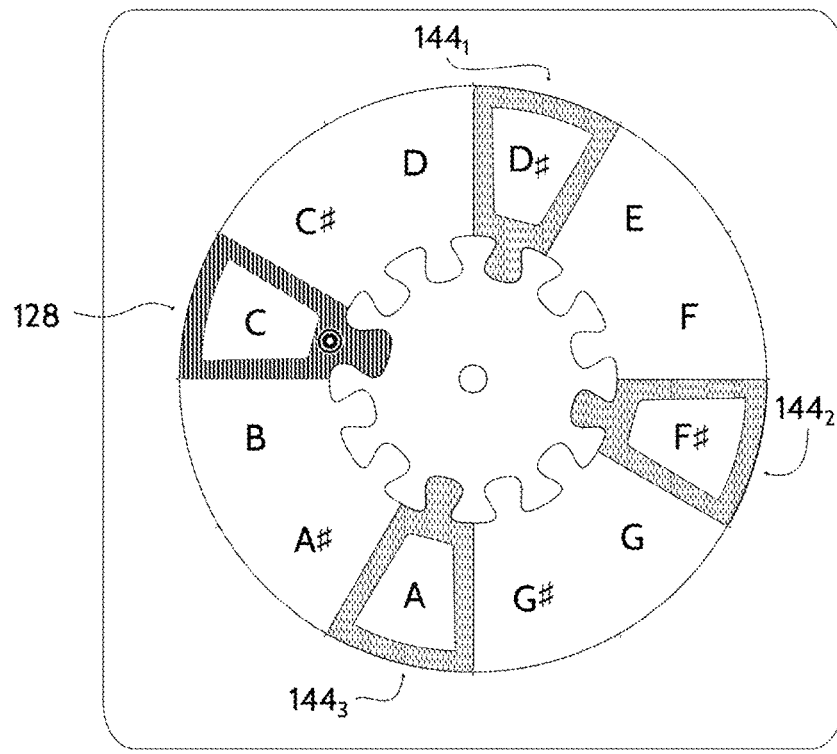
FIG. 18 shows a top view of an assembled non-electronic embodiment, demonstrating the root and chord tones of a fully diminished seventh chord.

FIG. 18 is a top view of the assembled non-electronic embodiment of FIG. 10, demonstrating the root and chord tones in a fully diminished seventh chord. The red tonic "window piece" 128 demonstrates C as the root of the chord, and purple colored window pieces $144_1$, $144_2$ and $144_3$ demonstrate D #, F #, and A as the remaining notes in a fully diminished seventh chord.

Figure 19:
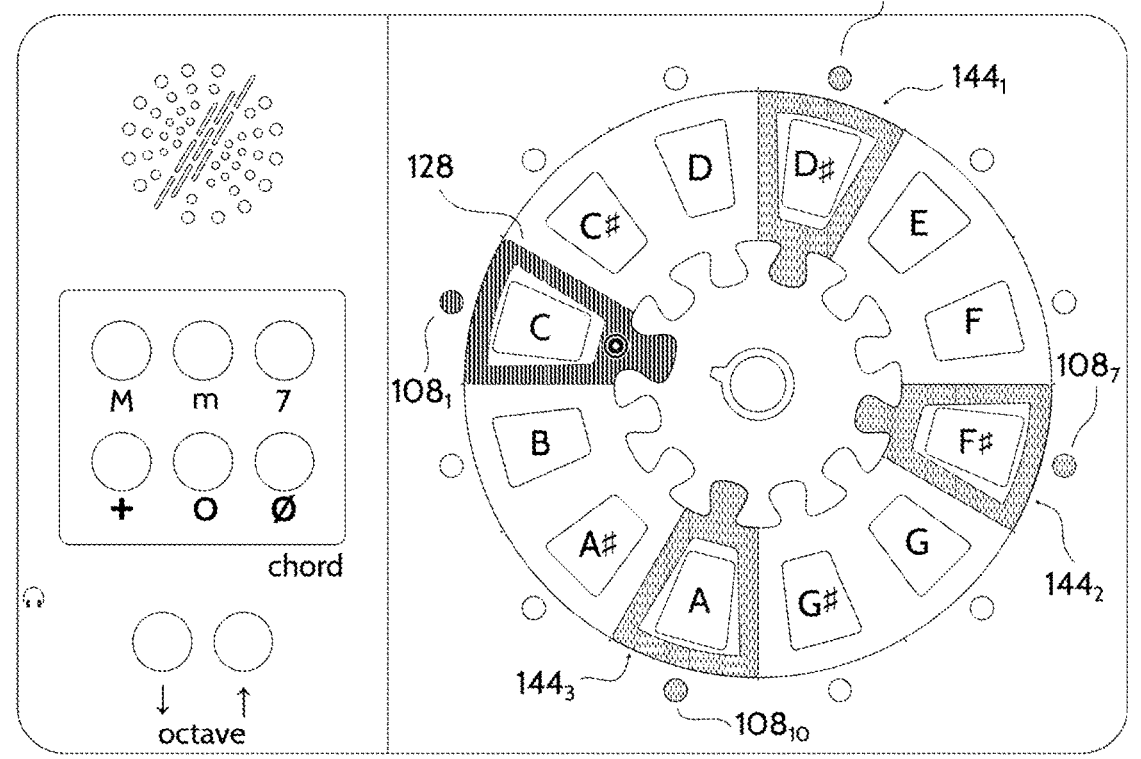
FIG. 19 shows a top view of the preferred embodiment, with both window pieces and LED indicators demonstrating a fully diminished seventh chord.

FIG. 19 is a top view of the electronic embodiment of FIG. 1, with both window pieces and LED indicators demonstrating a fully diminished seventh chord. The red tonic "window piece" 128 demonstrates C as the root of the chord, and purple colored window pieces $144_1$, $144_2$ and $144_3$ demonstrate D #, F #, and A as the remaining notes in a fully diminished seventh chord. A red LED indicator $108_1$ as described in FIG. 1 demonstrates the root, and purple illuminated LED lights $108_4$, $108_7$, and $108_{10}$ demonstrate the remaining chord tones.

FIG. 20 is a top view of an electronic embodiment according to claim 9 and claim 10. There is no center piece, and no indicator pieces physically attach. Instead, selection and subselection layers of musical Information are visually demonstrated entirely by LED lights. A red LED indicator $108_1$, as described in FIG. 1 demonstrates the root, and purple illuminated LED lights $108_4$, $108_7$, and $108_{10}$ demonstrate the remaining chord tones.

The invention claimed is:

1. An apparatus for demonstration of musical concepts, the apparatus comprising:
    a base layer displaying 12 indicia representing the 12 notes of the musical octave, radially arranged and equally spaced, in chromatic order;
    an indicator capable of selecting for demonstration one of the 12 said indicia as a start point, or tonic;
    a means for selecting and demonstrating any permutation and combination of the remaining 11 indicia visually, such that the position of each selection is fixed in relation to the start point, or tonic;
    a means for axial rotation (transposition) of the entire selection including the tonic, such that the arrangement of the selected notes remains fixed relative to the start point, or tonic;
    a means for further visual subselection within the selection, in order to demonstrate chords, chord roots, scale tones, and mode start point;
    a means for electromechanically encoding said tonic selection such that the location of the tonic can be set as a "start point" for the purpose of visual and audible demonstration of music concepts.

2. The device according to claim 1 wherein 12 "window pieces" can be affixed to a physical rotating center piece, in order to select and demonstrate any permutation and combination of notes in the selection layer of musical information.

3. The device according to claim 2 wherein a single "tonic piece" is visually distinct from the remaining 11 physical indicators, and is constrained by means of its attachment to align with a start point indicator on said center piece.

4. The device according to claim 2 wherein puzzle connectors, magnets, dips, or velcro are used to affix said window pieces to said center piece.

5. The device according to claim 2 wherein said physical indicators used to select and demonstrate any permutation and combinations of notes are variously colored or otherwise marked to further demonstration subselection layer (chord and function) musical information.

6. The device according to claim 1 further comprising 12 sensors or buttons for registering touch input, each coupled to one of said 12 chromatic note indicia and which sensors, when activated, transmit "NOTE ON" events to a microcontroller, which in turn outputs audio, visual, and/or MIDI data based on the selected note or notes to a speaker, screen, LED array, headphones or device that accepts MIDI control data.

7. The device according to claim 6 further comprising 12 LED lights, each in proximity to one of said sensor/note indicia pairs, activated by said "NOTE ON" events for the purpose of visual demonstration of sounding notes.

8. The device according to claim 1 wherein 12 LED lights, each paired with one of said sensor/note indicia pairs, are used to select and demonstrate any permutation or combination of notes in the selection layer.

9. The device according to claim 6 wherein LED lights of varying colors are used to demonstrate subselection layer musical information such as chord roots, scale tones, chord tones, mode start point, and the tonic.

10. The device according to claim 6 further comprising an octave up and an octave down button which can be used to shift the octave of a desired note to reach higher or lower pitch registers, particularly for demonstrating scales in the selection layer of musical information.

11. The device according to claim 6 further comprising "chord" buttons, such that holding down said chord button or combination of chord buttons to select a chord type (e.g. Major+7), in combination with note input via said sensor/note indicia pairs to select a desired chord root (e.g. G) produces the desired chord (G Major 7) for visual and audible demonstration of the correct chord tones via said LED lights and speaker or headphones.

12. The device according to claim 1 in which a single rotary encoder and microcontroler are used to electromechanically encode the position of the tonic.

13. The device according to claim 1 in which 12 buttons or switches, each paired with a single note indicia, are used to electromechanically select and encode the position of the tonic.

14. The device according to claim 6 in which selection and subselection layer musical information such as tonic, key signature and associated sharps and flats, mode start point, mode name, chord root, chord tones, chord name, scale tones or scale name are displayed visually on a screen.

* * * * *